Nov. 9, 1965

C. H. LISTER, JR 3,216,552

EXTENSIBLE CONVEYOR

Filed Feb. 10, 1964

CHARLES H. LISTER, Jr.
INVENTOR.

BY

Nov. 9, 1965    C. H. LISTER, JR    3,216,552
EXTENSIBLE CONVEYOR
Filed Feb. 10, 1964    3 Sheets-Sheet 2

CHARLES H. LISTER, Jr.
INVENTOR.

Nov. 9, 1965     C. H. LISTER, JR     3,216,552
EXTENSIBLE CONVEYOR
Filed Feb. 10, 1964     3 Sheets-Sheet 3
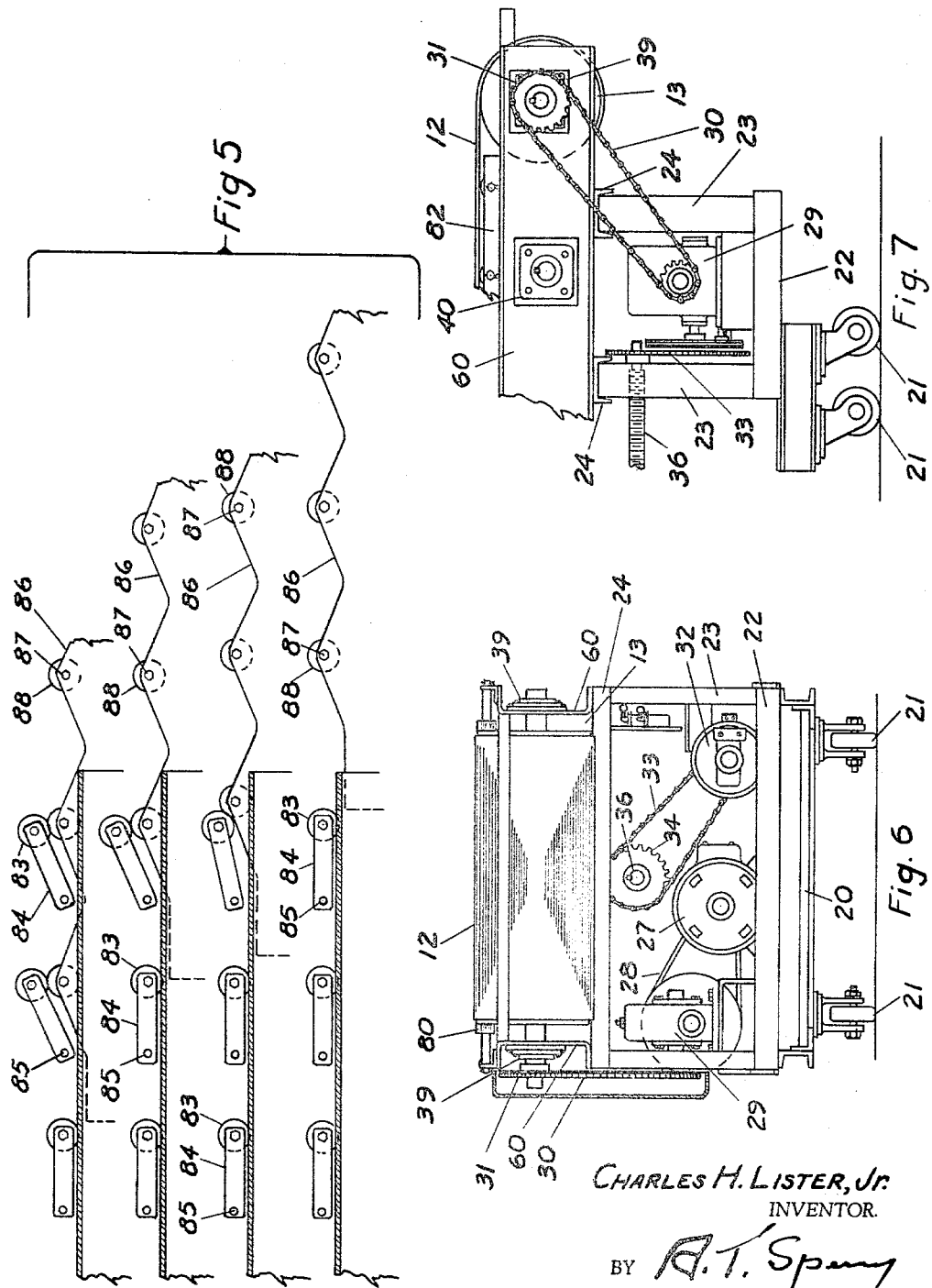
CHARLES H. LISTER, Jr.
INVENTOR.
BY A.T. Spery

3,216,552
EXTENSIBLE CONVEYOR
Charles H. Lister, Jr., Oldsmar, Fla.
Filed Feb. 10, 1964, Ser. No. 343,519
6 Claims. (Cl. 198—139)

This invention relates to extensible conveyors. The design, construction and operative features of the device lend themselves particularly to loading and unloading operations with respect to ships, railway cars, motor vehicles, and the like, where the loading and unloading of cargo calls for an extension or diminishment of length of the conveyor to accommodate the location of the goods being handled, and for ease in desirably locating the apparatus and adjusting its vertical position to varying requirements. In general, the present construction provides a simple, rigid and durable design, facility of operation and economy of manufacture.

Among the outstanding features of the invention, by which it may be distinctly characterized from extensible conveyors heretofore manufactured, is the provision of means for providing complete mobility of the entire unit to facilitate ease of disposing the conveyor for use in various locations. Another important feature of the invention is the provision of power means for extending or retrieving the conveyor flight. Another feature of the invention is the provision of retractable supporting means by which the elevation of the flight surface of the conveyor may be readily varied to meet varying circumstances. A further novel feature of the invention resides in the provision of means whereby in the extension or retraction of the conveyor flight, supporting rollers may be automatically moved to and from inter-digital relationship to facilitate such extension or retraction.

It is therefore among the general objects of the present invention to provide a novel and improved extensible conveyor. One feature of the invention resides in the fact that the structure may be used as a power driven belt conveyor or may provide an extensible roller trackway on which articles may be moved with minimum effort. Another equally important object of the invention is to provide an extensible conveyor having power means for the retraction or withdrawal of interrelated parts by which the flight length of the conveyor may be varied. A further object of the invention is to provide a structure of the character defined, having improved means for altering the vertical height of the conveyor flight to accommodate varying work conditions. A further object of the invention is to provide a novel and improved structure by which mobility is provided to facilitate movement of the structure between operating locations. Numerous other objects, features and advantages of the present invention will be apparent from consideration of the following specification, taken in conjunction with the accompanying drawings, in which:

FIG. 5 is a composite view showing the action of the rollers in the telescopic movement of one conveyor section with respect to another, FIG. 6 is a front end elevation of the present form of the invention, and FIG. 7 is a fragmentary side elevation of the front section of the present conveyor.

Figure 1:
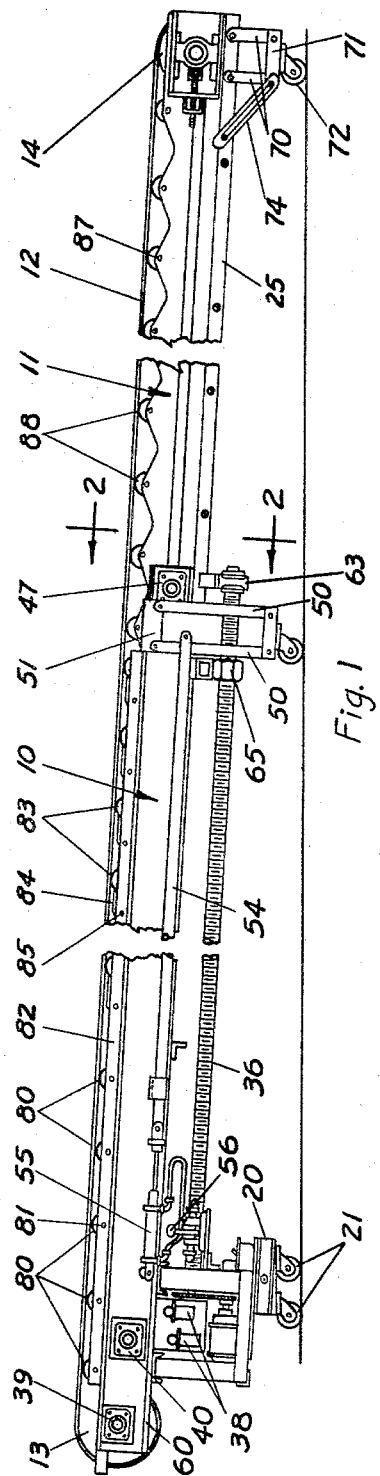
FIG. 1 is a side elevation of one preferred form of the present invention.
Figure 4:
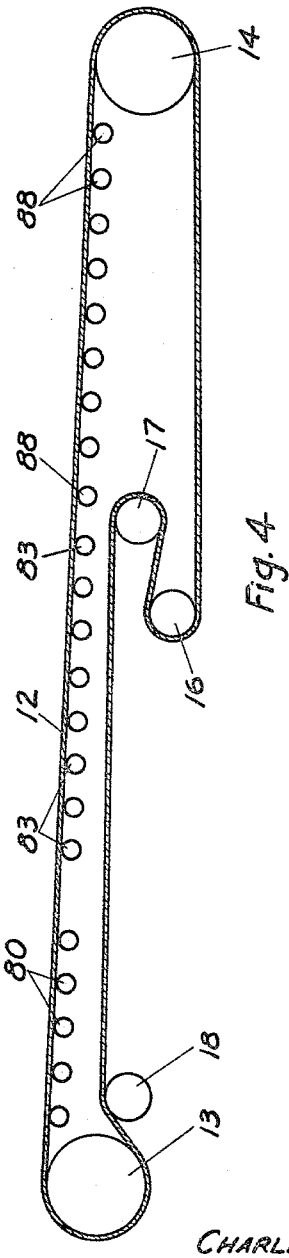
FIG. 4 is a schematic side elevation illustrating the belt circuit of the present conveyor.

Referring to the drawings, the numeral 10 indicates generally the main or forward relatively fixed element of the present extensible conveyor. The numeral 11 generally indicates the relatively movable or extensible, telescopically arranged rear element of the conveyor. As is schematically illustrated in FIGURE 4, the belt 12 extends from a drive pulley 13 at the left or receiving end (as shown in FIGURE 1) of the forward relatively fixed element 10 of the device. From the pulley 13 a carrying flight or upper surface belt 12 extends to a flight terminal return pulley 14 mounted on the outer terminal end of the extensible element 11 of the conveyor. The belt is supported in its carrying flight between the pulleys 13 and 14 by transverse rollers 80, 83 and 88, as hereinafter described.

From the pulley 14, the belt is returned to a movable pulley 16 carried by the extensible element 11 and thereover to a fixed pulley 17 on the outer end of the element 10. A guide roller 18 adjacent the main drive pulley 13 is provided to direct the flight of the belt from the pulley 17 to the pulley 13. In this arrangement, it will be seen that as the extensible element 11 of the conveyor is retracted with the pulley 14 moving to the left, in FIGURE 1, to shorten the material supporting flight of the conveyor, the pulley 16 will move therewith. Such movement to the left will extend the distance between the pulleys 16 and 17. Such increased distance between the pulleys 16 and 17 will compensate for the reduced distance of the upper flight of the belt, thus maintaining the belt in taut relation regardless of the telescopic extension or withdrawal of the element 11 with respect to the element 10.

The forward receiving end of the relatively fixed conveyor element 10 is supported by a dolly 20. Freely pivotal caster-type wheels 21 thus support the forward end of element 10 for ease in location in any direction desired. On the dolly 20 there is provided a generally rectangular motor base 22, together with vertically extending corner standards 23. Mounted transversely across the standards 23 channel bars 24 extend supporting the forward end of the parallel longitudinal side beams 60 of the forward conveyor element 10. On the base 22, a motor 27 is provided which drives, through a belt 28, suitable reduction gearing indicated at 29. The gearing 29 in turn drives chain 30 engaging a sprocket 31 of the primary drive pulley 13 for the conveyor belt 12.

The base 22 also supports a motor 32 which by chain 33 engaging a sprocket 34 provides rotation for a centrally extending longitudinal worm shaft 36 by which the secondary or auxiliary conveyor element 11 may be extended or retracted in telescopic manner with respect to element 10 in response to energization of the motor 32. As indicated at 38 in FIGURE 1, suitable motor controls may be conveniently supported for controlling the motors 27 and 32.

Figure 2:
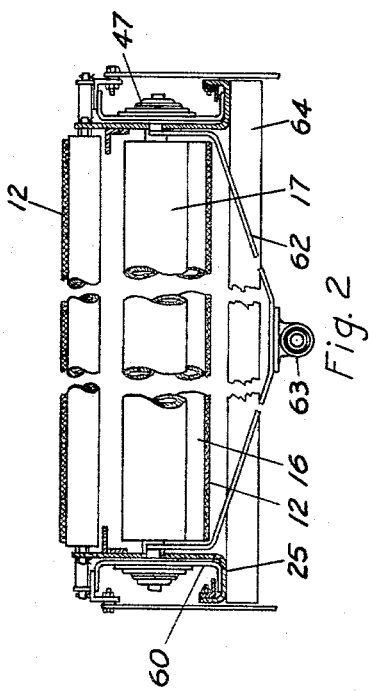
FIG. 2 is a sectional view taken on line 2—2 of FIGURE 1.
Figure 3:
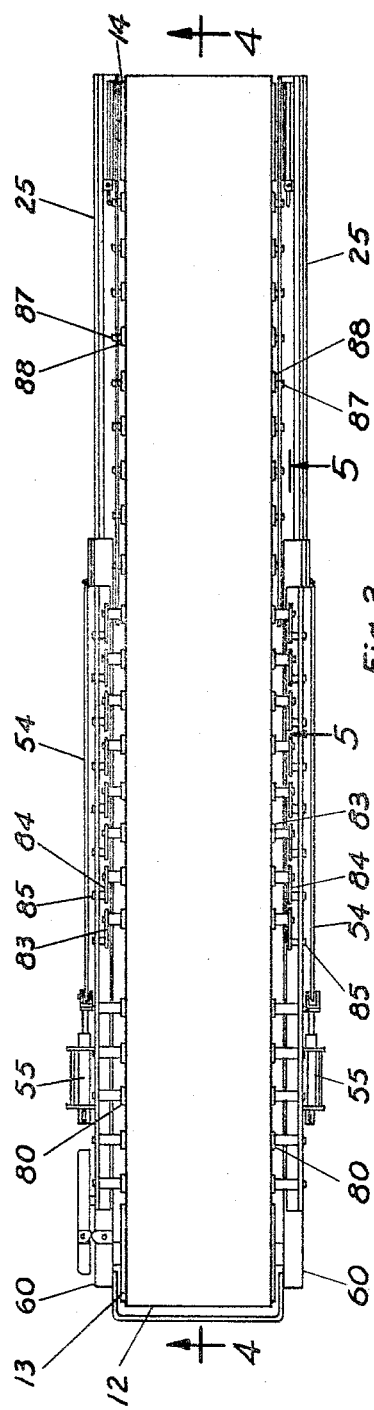
FIG. 3 is a top plan view of that form of the invention shown in FIGURE 1.

The side beams 60 of the primary conveyor element 10, supported at the front end by the channel bars 24, are here shown as outwardly open channel members providing a mounting for the bearing members 39 and 40 of the pulleys 13 and 18 respectively, as well as the bearing 47 for the pulley 17, as shown in FIGURE 2. At its rear or outer end, front section 10 of the conveyor is supported on pivoted legs 50 attached to the rails 60 through a mounting plate 51. For moving the legs 50 and thus to elevate or lower the rear end of the forward fixed conveyor section 10, there is provided a control rod 54 which may be suitably operated by an hydraulic cylinder 55 under the control of a lever 56, which may thus operate to control the elevation of the outer or rear end of the section 10 and therewith the inner or forward end of the extensible section 11.

The stationary element 10 is formed by outwardly facing channel beams 60, which are fitted for a sliding movement within the channel member 25 of the section 11.

At the forward or inner end, the channels 60 are joined by a downwardly inclined brace 62 supporting a terminal bearing 63 for the screw shaft 36. Forwardly of the base 26 a transverse bar 64 joins the extreme forward ends of the channel 25 and depending from the center portion thereof a travelling nut 65 which receives therethrough and threadingly engages the screw shaft 56. This arrangement is such that as the screw shaft is rotated, the nut will travel longitudinally thereon in a direction determined by the direction of rotation of the screw and the connection of the nut with the extensible portion 11 of the conveyor will cause the extensible section 11 to telescopically move with respect to the section 10 to provide for power means for extending or retracting the conveyor section 11 and thus determining the total length of the conveyor.

For supporting the extreme outer end of the extensible section 11 of the conveyor, pivoted arms 70 are provided engaging a rear dolly 71 provided with caster-type rollers 72 to facilitate movement of the conveyor in the manner of the casters 21. For maintaining the elevation of the rear end in suitably arrested position, a bracket 74 is provided which may be adjusted with respect to the rails 25 as to adjust the vertical location of the outer end of the section 11 commensurate with the location of the outer end of the front portion 10 through actuation of the control rod 54.

An important feature of the present invention is the construction and arrangement of transverse rollers supported by both forward element 10 and the rear element 11 in such manner as to provide for the support of a conveyor belt mounted on the pulleys, as indicated in FIGURE 4, or independently of a belt, whereby the conveyor becomes a roller slideway for articles which may be manually moved without the use of power means but in which case there is nevertheless extensible means in the manner hereinbefore described.

In the preferred arrangement of the present form of the invention with respect to the rollers there is provided in the front portion of the forward fixed element 10 a series of spaced rollers 80 mounted for free rotation each on a relatively fixed pintle 81. The pintles 81 are mounted through suitable side flanges 82 of the side rails of the element 10. On the opposite end of element 10 from approximately mid-position outwardly, the fixed conveyor 10 carries pivotally mounted rollers 83 supported on arms 84 which may be pivoted as at 85 to the flange 82. For cooperation and inter-fitting or inter-digitation of the rollers, the rear element is provided with a side flange 86 here shown as scalloped and in which there are fixedly disposed transverse pintles 87 upon which are disposed free rotatable rollers 88 of the element 11. It will, of course, be understood that in retracting or extending the element 11 from the element 10, the scalloped flange 86 of element 11 slides within the side flanges 82 of the fixed element 10.

By reference to FIGURE 5, it will be seen that as the element 11 is moved inwardly with respect to the fixed element 10, the rollers 88 will engage the rollers 83 mounted on the arms 84 at the outer portion of fixed element 10. By virtue of the fact that rollers 83 are supported on the pivoted arms 84, it will be seen that the contact with rollers 88 thereof will provide for upward swinging of the rollers 83 over the rollers 88 to permit the rollers 88 to pass beneath the rollers 83 and to inter-digitate therewith as illustrated in the upper views of FIGURE 5.

From a consideration of this arrangement it will be seen that telescopic movement of the movable conveyor 11 may accomplish with the automatic movement of its rollers 88 beneath the rollers 83 at the outer end of the fixed element 10 whereby in collapsed position the rollers of the one element will be located between rollers of the other element. As hereinbefore indicated, the present extensible conveyor may be utilized without the belt 12, in which case the rollers provide a continuous and extensible roller way over which articles may pass by gravity by the application of manual force, or by the pressure of one object against another. However, it is to be noted that the application of a belt, in the manner shown in FIGURES 1 to 4, will in no way interfere with the automatic movement and interfitting of the rollers and that such action will be accomplished whether a belt be applied or not. Where a belt is applied, the simple slackening of the belt will permit the upper flight thereof to accommodate the upward movement of the pivoted rollers as the rollers of the movable element move with respect thereto.

From the foregoing it will be seen that the present invention provides a novel and improved extensible conveyor, operable either as a belt conveyor or as a friction free slideway for the transportation of goods. It will be noted that the invention provides automatic means for elevating relative elements of the extensible conveyor and further provides power means for control of the extension of the conveyor. As herein noted, an important feature of the invention is roller means which is automatically operable to facilitate retraction or extension of the conveyor by telescopic action between parts and inter-fitting of the rollers.

It will of course be understood that the structure as shown is presented by way of example and that in the practice of the invention numerous changes, modifications and the full use of equivalents may be resorted to without departure from the spirit or scope of the invention as outlined in the appended claims.

What I claim is:

1. An extensible conveyor, including a pair of relatively movable conveyor elements adjustably inter-related to vary the total effective flight of the conveyor, transversely extending supporting means mounted on each conveyor element, said supporting means each comprising a plurality of rollers arranged in spaced relation along their respective conveyor elements, said rollers of both of said elements being normally disposed in a common plane, and a movable mounting for each of the plurality of rollers of one of said elements permitting their movement over the rollers of the other of said elements and into interspaced relation in a common plane with said rollers of the other of said elements.

2. An extensible conveyor, including a pair of slidable inter-connected conveyor elements, transverse supporting means mounted on each of said elements defining in combination a flight path of said conveyor lying in a single plane, and relatively movable mountings for a plurality of the transverse supporting means of one of said elements whereby the means of said one element may move past the means of the other element while the remainder of said means is within the single plane of the flight path.

3. A conveyor, including a pair of slidable inter-engaged conveyor elements, transverse supporting rollers on each of said elements mounted to be normally disposed in a common plane and pivotal mountings for the rollers of one of said elements to permit movement thereof to and from said plane to permit inter-digitation of said rollers in said common plane.

4. The conveyor as set forth in claim 3 wherein inter-engagement of the rollers upon relative movement of the elements provides for the pivotal movement of the pivotally mounted rollers of one element past the rollers of the other element.

5. A readily movable extensible conveyor adaptable as a power driven belt conveyor or a friction free roller slideway, including a relatively fixed receiving conveyor element and an interfitted telescopically related relatively movable delivery conveyor element, a fixed axis belt pulley at each end of each conveyor element, a caster mounted dolly supporting the forward end of said receiving conveyor element, power means on said dolly, a drive from said power means for one of the fixed axis pulleys of said relatively fixed conveyor element, a drive from said power means on said dolly engaging said relatively movable conveyor element for telescopically moving said relatively movable element with respect to said relatively fixed element, a vertically adjustable caster mounted support for the rearward end of said relatively fixed conveyor and for the forward end of said relatively movable conveyor element, power means for operating said vertically adjustable support, transverse supporting rollers for said relatively fixed conveyor element and transverse supporting rollers on said relatively movable conveyor element, and movable mountings for each of the plurality of rollers of said relatively movable conveyor element permitting their movement over the rollers of said fixed conveyor element and into interspaced relation in a common plane with said rollers of said fixed conveyor element.

6. A readily movable extensible conveyor adaptable as a power driven belt conveyor or a friction free roller slideway, including a relatively fixed receiving conveyor element and an interfitted telescopically related relatively movable delivery element, a fixed axis belt pulley at each end of each element, a caster mounted dolly supporting the forward end of said receiving conveyor element, power means on said dolly, a drive from said power means for one of the fixed axis pulleys of said receiving element, a drive from said power means on said dolly engaging said delivery element for telescopically moving said delivery element with respect to said receiving element, a vertically adjustable caster mounted support for the rearward end of said receiving element and the forward end of said delivery element, power means for operating said vertically adjustable support, a manually operable vertically adjustable support for the rearward end of said delivery element, transverse supporting rollers for said receiving conveyor element mounted on fixed axes extending across said element, transverse supporting rollers on said delivery element normally disposed in a common plane with the rollers of said receiving element, and means pivotally mounting said rollers of said delivery element to permit inter-digitated disposition of the rollers of both of said elements.

References Cited by the Examiner
UNITED STATES PATENTS

| | | | |
|---|---|---|---|
| 2,678,125 | 5/54 | Bonney | 198—139 |
| 2,760,617 | 8/56 | Bowen | 198—139 |
| 2,826,290 | 3/58 | Barski | 198—139 |
| 2,919,013 | 12/59 | Culpepper | 198—139 |
| 3,029,745 | 4/62 | Brown | 198—139 |
| 3,127,978 | 4/64 | Zuercher | 198—139 |

FOREIGN PATENTS 517,708  2/31  Germany.

HUGO O. SCHULZ, *Primary Examiner.*
RICHARD E. AEGERTER, *Examiner.*